US009069711B2

(12) United States Patent
Agombar et al.

(10) Patent No.: US 9,069,711 B2
(45) Date of Patent: *Jun. 30, 2015

(54) SOURCE CLEANING CASCADED VOLUMES USING WRITE AND BACKGROUND COPY INDICATORS

(75) Inventors: John P. Agombar, Winchester (GB); Christopher B. Beeken, Eastleigh (GB); Carlos F. Fuente, Portsmouth (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,177

(22) Filed: Sep. 13, 2012

(65) Prior Publication Data

US 2013/0346712 A1 Dec. 26, 2013

Related U.S. Application Data

(63) Continuation of application No. 13/532,687, filed on Jun. 25, 2012.

(51) Int. Cl.
  *G06F 12/00* (2006.01)
  *G06F 13/00* (2006.01)
  (Continued)

(52) U.S. Cl.
  CPC ........ *G06F 11/1458* (2013.01); *G06F 11/1456* (2013.01)

(58) Field of Classification Search
  CPC ............ G06F 11/1446; G06F 11/1448; G06F 11/1458; G06F 17/3015
  USPC ......................................... 711/114, 161, 162
  See application file for complete search history.

(56) References Cited

U.S. PATENT DOCUMENTS 5,522,037 A 5/1996 Kitagawa et al.
7,395,378 B1 7/2008 Pendharkar et al.
(Continued)

FOREIGN PATENT DOCUMENTS

CN 1704903 12/2005
CN 1726472 1/2006
CN 1926819 3/2007

OTHER PUBLICATIONS

International Search Report and Written Opinion; PCT Application No. PCT/IB2013/054877; Nov. 21, 2013.
(Continued)

*Primary Examiner* — Tuan Thai
*Assistant Examiner* — Shane Woolwine
(74) *Attorney, Agent, or Firm* — James L. Baudino

(57) ABSTRACT

Various systems, processes, and products may be used to source clean cascaded volumes. In particular implementations, a system, process, and product for source cleaning cascaded volumes may include the ability to store a primary volume and a plurality of cascaded backup volumes. The system, process, and product may also include the ability to determine whether a write to one of the backup volumes is due to a background copy being made of another volume in the cascade and adjust a background copy indicator in a volume map for the backup volume if the write is due to a background copy and to determine whether a write to one of the backup volumes is due to a write to another volume in the cascade and adjust a write copy indicator in a volume map for the backup volume if the write is due to a write to another cascaded volume.

10 Claims, 5 Drawing Sheets

(51) Int. Cl.
*G06F 13/28* (2006.01)
*G06F 11/14* (2006.01)

(56) References Cited

U.S. PATENT DOCUMENTS

| | | |
|---|---|---|
| 7,669,024 B2 | 2/2010 | Fuente |
| 7,733,782 B2 | 6/2010 | Sunnell et al. |
| 7,904,684 B2 | 3/2011 | Werner et al. |
| 2006/0026349 A1 | 2/2006 | Gower et al. |
| 2006/0075293 A1 | 4/2006 | Bodlaender |
| 2006/0139697 A1* | 6/2006 | Fuente ............ 358/296 |
| 2006/0143413 A1* | 6/2006 | Agombar et al. ............ 711/162 |
| 2008/0215837 A1 | 9/2008 | Agombar et al. |
| 2009/0037766 A1* | 2/2009 | Agombar et al. ............ 714/5 |
| 2009/0106332 A1 | 4/2009 | Agombar et al. |
| 2009/0319735 A1 | 12/2009 | Agombar et al. |
| 2010/0036996 A1 | 2/2010 | Agombar et al. |
| 2010/0088468 A1 | 4/2010 | Agombar et al. |
| 2010/0250882 A1 | 9/2010 | Hutchison et al. |
| 2010/0318757 A1 | 12/2010 | Beeken et al. |
| 2011/0208932 A1 | 8/2011 | Agombar et al. |
| 2011/0289291 A1 | 11/2011 | Agombar et al. |
| 2011/0307675 A1* | 12/2011 | Kano ............ 711/162 |
| 2012/0016842 A1* | 1/2012 | Furuya ............ 707/649 |

OTHER PUBLICATIONS

Microsoft Technet, "How Volume Shadow Copy Service Works" (on-line), (retrieved from technet.microsoft.com/en-us/library/cc785914(d=printer,v=WS.10).aspx), Mar. 28, 2003 (retrieved on Dec. 24, 2011), Microsoft (8 pages).

IBM, "FlashCopy Mappings" (on-line), (retrieved from http://publib.boulderibm.com/infocenter/storwize/ic/index.jsp?topic=%2Fcom.ibm.storwize.v7000.doO/02Fsvc_flashmapovr_21i9wu.html), (retrieved on Sep. 8, 2011), IBM (5 pages).

Rumney, Dan, "Visualizing IBM SAN Volume Controller FlashCopy Mappings" (on-line), (retrieved from http://www.danrumney.co.uk/papers/visualfcms/visualisefcms.pdf), Jan. 22, 2009, (14 pages).

Wikipedia, "Inode" (on-line), (retrieved from en.wikipedia.org/w/index.php?title=Inode&oldid=494679136), May 22, 2012 (retrieved on Jun. 22, 2012) (3 pages).

U.S. Appl. No. 13/532,756, naming Christopher B. Beeken et al. as inventors and filed on Jun. 25, 2012.

* cited by examiner

SOURCE CLEANING CASCADED VOLUMES USING WRITE AND BACKGROUND COPY INDICATORS

BACKGROUND

The present invention relates to managing computer data, and more specifically to cleaning cascaded volumes.

It is common for a storage system to have a disk backed up in the case of loss due to hardware malfunction and/or natural disaster. A backup disk may be created by various techniques. For example, a backup disk may be made using snapshot or cloning techniques.

A snapshot is a point-in-time copy that is dependent on the primary disk. A snapshot may, for example, be accomplished using a copy-on-write procedure, in which currently existing data in a region on the primary disk is written to the backup disk when a write is being made to the region on the primary disk. Thus, the backup disk will contain data that has been overwritten on the primary disk, as opposed to a complete copy of the primary disk. This type of backup copy typically results in a thinly provisioned volume, which reduces storage. A series of snapshot copies may be cascaded together to represent the primary disk at various times. However, the snapshot copies typically remain dependent on the primary disk to reassemble a complete copy of the primary disk.

A clone is a point-in-time copy that is independent of the primary disk. A clone may, for instance, be created by executing a background copy procedure in which a disk's regions are sequentially copied to the backup disk and executing a copy-on-write procedure to immediately copy any primary disk regions that are about to be overwritten due to a write and have not yet been processed by the background copy procedure. A clone is typically used when a copy is needed and input/output (IO) to the copy must not impact IO to the primary volume in any way. A clone may also be used when the copy is not to be affected by availability to the source. A clone may also be used in a cascade.

BRIEF SUMMARY

In one implementation, a process for source cleaning cascaded volumes may include storing a primary volume and a plurality of cascaded backup volumes for the primary volume and determining whether a write to one of the backup volumes is due to a background copy being made of another volume in the cascade or due to a write to another volume in the cascade. If the write is due to a background copy of another volume in the cascade, the process may include adjusting a background copy indicator in a volume map for the backup volume. If the write is due to a write to another volume in the cascade, the process may include adjusting a write copy indicator in the volume map for the backup volume.

The details and features of various implementations will be conveyed by the following description, along with the drawings.

DETAILED DESCRIPTION

Figure 1:
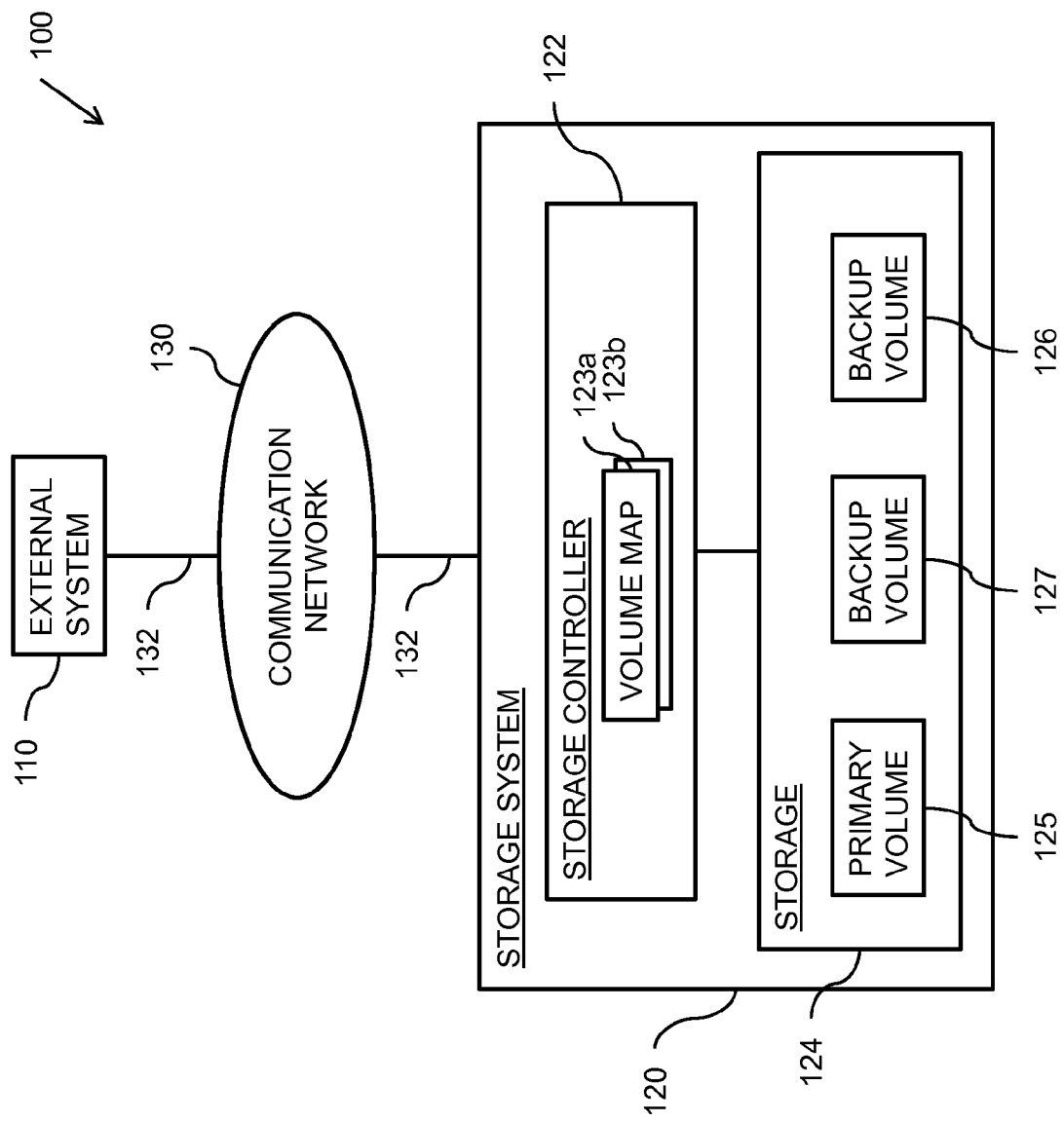
FIG. 1 is a block diagram illustrating an example system for source cleaning cascaded volumes.

Source cleaning cascaded volumes may be achieved by various techniques. In particular implementations, the cascaded volumes may include a primary volume a number of cascaded backup volumes. Source cleaning of the cascaded volumes may include determining whether a write to the backup volumes is due to a background copy being made of another volume in the cascade or due to a write to another volume in the cascade. The reason for the write to the backup volumes may be logged in a volume map for each volume. When one of the volumes needs to be cleaned (e.g., because it is being removed or restarted), the volume maps for the cascaded volumes may be analyzed to determine which data on the volume to be cleaned needs to be moved to another volume to maintain the data integrity of the remaining volume.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

FIG. 1 illustrates an example system 100 for source cleaning cascaded volumes. System 100 includes an external system 110, a storage system 120, and a communication network 130.

External system 110 may generally be any computer system that has some of its data stored by generating writes to storage system 120. External system 110 may, for example, be a server system generating data that needs to be stored. Example server systems include Web servers. If the external system is a server system, the server system may include one or more servers, which may be co-located or distributed.

Storage system 120 may store data for various external systems (e.g., server systems running Advanced Interactive eXecutive (AIX) or Windows), which may be local or remote from the storage system. In particular implementations, storage system 120 may provide the primary storage for the example system while other storage systems (not illustrated) provide backup storage (e.g., by synchronous or asynchronous replication). Storage system 120 may, for example, include storage area networks, raid arrays, hard drives, tape drives, or any other device for storing data. Storage system 120 may, for instance, store data in block arrays.

Storage system 120 includes a storage controller 122 and storage 124 (e.g., a hard disk, a tape, etc.). Storage controller 122 is responsible for placing data in storage 124. For the sake of discussion, storage 124 includes a primary volume 125 and backup volumes 126-127. However, storage 124 may typically be configured to include any number of volumes. Volumes 125-127 may, for example, be actual physical devices in storage 124 (e.g., hard drives), portions of physical devices, or representations of physical devices. Storage 124 may also have a number of other volumes that it is storing.

External system 110 and storage system 120 are communicatively coupled to each other through communication network 130. Communication network 130 may, for example, be a local area network (LAN), a wide area network (WAN), or the Internet. External system 110 and storage system 120 are coupled to communication network 130 through communication links 132, which may include one or more wireline (e.g., cable or fiber optic) and/or wireless links (e.g., radio frequency).

Backup volumes 126-127 may provide backup of primary volume 125 by various techniques. For example, backups may be made using snapshot and/or cloning techniques. As mentioned previously, a snapshot may be a point-in-time copy in which currently existing data in a region on the primary volume is written to the backup volume when a write is being made to the region on the primary volume. Thus, the backup volume will contain data that has been overwritten on the primary volume, as opposed to a complete copy of the primary volume. A region may, for example, be a sector or other addressable portion of a volume. In particular implementations, a region may be approximately 64 KB in size.

This type of backup copy typically results in a thinly provisioned volume, which reduces storage, and may be useful in the event of data corruption on the primary volume. Often, there are many snapshots of a single source existing concurrently, so their reduced size is beneficial. A snapshot may exist in a cascade of volumes for a considerable amount of time (e.g., months or years), but is typically only kept for hours or days.

A clone copy may, for example, be created by executing a background copy procedure in which a volume's regions are sequentially copied and executing a copy-on-write procedure to immediately copy any volume regions that are about to be overwritten due to a write and have not yet been processed by the background copy procedure. A clone is typically used when a copy is needed and input/output (IO) to the copy must not impact IO to the primary volume in any way. A clone may also be used when the copy is not to be affected by availability to the source. That is, a clone may be removed from the cascade and still function properly. For example, a clone may be used to take a database to another site. A clone is typically copied to tape once it has completed.

Backup volumes 126-127 may provide backup for primary volume 125 by being cascaded with each other. Storage controllers such as a SAN Volume Controller (SVC) from International Business Machines of Armonk, N.Y. may use a cascading implementation to enhance source volume.

For example, assume backup volume 126 is the earlier of the two backup volumes 126-127 to provide backup for primary volume 125. Backup volume 126 may provide backup beginning at a time T1, and backup volume 127 may provide backup beginning at a time T2. At T1, the cascade would be primary volume 125->backup volume 126. At T2, the cascade would be primary volume 125->backup volume 127->backup volume 126. The cascading approach works such that when a new backup volume is started, an existing backup volume using the primary volume as its source volume is modified to use the target volume of the new backup as its source volume.

Assuming backup volume 126 operates by a snapshot technique, backup volume 126 provides backup by storing the changes to primary volume 125 since the backup began at T1. In this two element cascade, primary volume 125 is the source, and backup volume 126 is the target. Primary volume 125 may therefore be referred to as the effective source of the primary volume 125->backup volume 126 map. As mentioned previously, this backup may be accomplished by using copy-on-write. Thus, a write to primary volume 125 may involve copying the data in the region to be written to on primary volume 125 to backup volume 126 and then writing the new data to the region of primary volume 125. Thus, the data that was on primary volume 125 when the backup to backup volume 126 became active at T1 will be stored on primary volume 125 (i.e., for the volume regions that have not been written to) and on backup volume 126 (i.e., for the regions that have been written to).

If a read needs to be performed on backup volume 126 (e.g., to determine data on primary volume 125 at T1), the read may proceed by first attempting to locate the data backup volume 126. If the data is not on that volume (i.e., because it was never overwritten on primary volume 125), the data may be read from primary volume 125.

Primary volume 125 may on occasion need to be restored to its state at T1. For example, this may occur due to a data corruption. The data that has been overwritten on primary volume 125 since backup volume 126 became active may be retrieved from backup volume 126 to restore primary volume 125 to its state at T1.

At a later point in time, T2, the backup to backup volume 127 may become active and store a representation of primary volume 125 beginning at T2. At this point, it is no longer necessary to update backup volume 126 as backup volume 127 will contain the data of primary volume 125 at T2. Thus, the backup chain becomes primary volume 125->backup volume 127->backup volume 126. And now the map for primary volume 125->backup volume 126 has source backup volume 127 as the effective source. This transformation is valid because backup volume 127 is an exact copy of primary volume 125 at this point in time (at least for the data regions that it stores).

Backup volume 127 may operate by snapshot or cloning techniques. If it operates by a snapshot technique, writes to primary volume 125 may be treated as they were for the primary volume 125->backup volume 126 cascade, except that the data being overwritten on primary volume 125 will be placed on backup volume 127. If backup volume 127 operates by a cloning technique, regions of primary volume 125 will be written to backup volume 127 by a combination of sequential reading, which may take a relatively long period of time, and on-demand writes (e.g., due to data being overwritten by writes to primary volume 125).

In order to maintain the data for this cascade, an IO algorithm may be used. For example, for reads: 1) if a read of backup volume 126 is requested, read backup volume 126 if the requested data is on that volume (e.g., according to region), else read backup volume 127 if the requested data is on that volume, else read primary volume 125; 2) if a read of backup volume 127 is requested, read that volume if the requested data is on that volume, else read primary volume 125; and 3) if a read of primary volume 126 is requested, read that volume.

For writes: 1) if a write to backup volume 126 is requested, write to that volume; 2) if a write to backup volume 127 is requested: a) if backup volume 126 needs data held on primary volume 125, then read the primary volume, write the result to backup volume 126, and write the new data to backup volume 127; b) else if backup volume 126 needs data held on backup volume 127, then read backup volume 127, write the result to backup volume 126, and write the new data to backup volume 127; or c) else write to backup volume 127; and 3) if a write to primary volume 125 is requested: a) if backup volume 127 needs the data held on primary volume 125, read primary volume 125, write the result to backup volume 127, and then write the new data to primary volume 125; and b) else write to primary volume 125.

This IO algorithm allows multiple targets (e.g., two or more) to be cascaded. Moreover, a write to primary volume 125 results in at most one extra write to a backup volume irrespective of the number of backup volumes for primary volume 125. Thus, the impact of the backup maps on the source/production IO performance is relatively small and also bounded.

At some point after T2, backup volume 126 is typically dependent on backup volume 127. For example, if a data region was not transferred to backup volume 126 between T1 and T2 (e.g., because there was no write to primary volume 125 during that time) but was transferred to backup volume 127 after T2 (e.g., because there was a write to primary volume 125 after T2), backup volume 126 would need this data to restore primary volume 125 to its state at T1. If backup volume 127 is to be removed from the cascade after this point without affecting backup volume 126, backup volume 127 should be cleaned. That is, the data on backup volume 127 that is needed for reads (e.g., from an external system) to backup volume 126 must first be copied to backup volume 126. This process can take a relatively long time. Moreover, if backup volume 127 was constructed by a clone technique, which may have resulted in backup volume 127 becoming fully allocated, and backup volume 126 was constructed by a snapshot technique, the cleaning operation may determine that most of backup volume 127 needs to be transferred to backup volume 126, which can dramatically increase the amount of data being stored on backup volume 126, especially if it becomes fully allocated.

In certain modes of operation, the regions of data on the volumes may be classified to determine if the data hold on the regions must be cleaned or whether the data is still accessible (e.g., on primary volume 125) to the dependent volume (e.g., backup volume 126) even when an intervening volume (e.g., backup volume 127) is removed. The minimum amount of metadata required to track whether a target volume region contains the data to be returned for a read operation is one bit. Thus, the amount of metadata required per target volume is a bitmap containing enough bits for all regions of data on the volume. However, this does not allow for a determination as to why the data was placed in the volume region. For example, the data could have been written to the volume due to a write (e.g., from an external system), due to a split from a write, or due to a background copy being made of an upstream volume. An "upstream" volume is one that is towards the primary volume using the current volume as a reference, and a "downstream" volume is one that is away from the primary volume using the current volume as a reference.

Storage controller 122 includes volume maps 123 that may store metadata regarding the regions on backup volumes 126-

127. In particular, volume maps 123 may define why the data in a region is in the region. For example, the volume maps may specify whether the data was placed in a region due to a write (e.g., from a snapshot technique or a direct write to the volume) versus a background copy (e.g., from a clone technique).

In some implementations, each volume map 123 includes two bitmaps, with each bitmap containing a bit for each region, whether allocated or potential, on the volumes. One bitmap may be used to mark the regions that have data due to a background copy, and the other bitmap may be used to mark the regions that have data to a write (e.g., to the volume itself or to another volume).

For example, suppose there are three volumes A, B, and C that each contain three regions of data. Furthermore, suppose there are volume maps A->B and B->C, each with 2 bitmaps, a background copy bitmap and a write copy bitmap. When the map A->B is started, the cascade may be represented by A->((0,0,0),(0,0,0))->B, where ->((0,0,0),(0,0,0))->represents the two bitmaps for a volume map such that ->((background copy bitmap),(write copy bitmap))->.

If there is then a write to volume A at region 0, the bitmaps are modified to reflect the movement of data described in the IO algorithms mentioned above -A->((0,0,0),(1,0,0))->B, which indicates that volume B holds its own data for region 0 and that this is not due to background copy. If the copy from volume A to volume B is a clone, the background copy would not try to copy this region again. It would only copy regions from volume A to volume B if volume B does not already contain its own copy of the data. If there is a background copy of region 1 to volume B, this would result in the bitmaps looking like A->((0,1,0),(1,0,0))->B, which indicates that volume B holds its own data for region 1 and that this is due to background copy.

Later, if a backup copy was started for volume B to volume C, the cascade would look like A->((0,1,0),(1,0,0))->B->((0,0,0),(0,0,0))->C. For a write to volume B at region 2, the cascade becomes A->((0,1,0),(1,0,1))->B->((0,0,0),(0,0,1))->C, which indicates that volume B and volume C contain their own copy of the data and that they obtained these due to a write (e.g., from an external system). Volume C obtained the data from region 2 of volume A. A write to volume B may, for example, be used to provide test and/or development.

If volume B is then to be removed from the cascade, the backup from volume B to volume C may need to be cleaned. By examining the bitmaps, it may be determined that region 0 needs to be cleaned because volume B contains data and it cannot be on volume A. That is, the volume map for volume B indicates that volume B obtained the data for region 0 due to a write, which means that the data now longer is resident on volume A. For region 1, however, volume B's volume map indicates that volume B obtained the data due to a background copy, which means that the data should still exist on volume A. Thus, no copy of region 1 needs to be made to volume C. Additionally, although volume B's volume map indicates that volume B obtained the data in region 2 due to a write, volume C's volume map indicates that volume C already has data stored for this region, which means that volume C does not need the data in region 2 from volume B.

The B->C copy may then be cleaned by copying the data from region 0 of volume B to region 0 of volume C. The cleaning write to volume C may be treated as a write because volume A does not contain the data that volume C needs. Volume C's volume map may be adjusted to show the relationship between volume A and volume C-A->((0,0,0),(1,0,1))->C, which indicates that region 0 of volume C obtained its data due to a write, region 1 of volume C has no data, and region 2 of volume C obtained its data due to a write.

In this example, the amount of cleaning has been reduced by half. That is, without the volume maps, the cleaning would have also had to write region 1 of volume B to volume C because it would have been unclear as to why this data arrived on volume B. Larger savings are possible for larger numbers of regions. Typically, only a small number of regions of a volume would be written to while most of the data would be transferred due to a background copy, if applicable.

As another example, suppose there are three volumes D, E, and F that each contain four regions of data. Furthermore, suppose volume D is the primary volume, volume E is an earlier backup volume, and volume F is a later backup volume, resulting in a chain D->F->E. Additionally, suppose that volume E provides backup by using a copy-on-write technique and volume F provides backup by using a clone technique, and there are volume maps for volumes E and F that each include two bitmaps, a background copy bitmap and a write copy bitmap.

When the backup of volume D by volume E is started, the cascade may be represented by D->((0,0,0,0),(0,0,0,0))->E, where ->((0,0,0,0),(0,0,0,0))->represents the two bitmaps for a volume map such that ->((background copy bitmap),(write copy bitmap))->.

If there is a write to volume D at region 1, the bitmaps are modified to reflect the movement of data described in the IO algorithms mentioned above -D->((0,0,0,0),(0,1,0,0))->E, which indicates that volume E holds its own data for region 1 and that this is not due to background copy. If there is now a write to volume D at region 2, the bitmaps are again modified to reflect the movement of data described in the IO algorithms -D->(0,0,0,0),(0,1,1,0)->E.

Now, if a backup copy is started for volume D to volume F, the cascade would look like D->((0,0,0,0),(0,0,0,0))->F->((0,0,0,0),(0,1,1,0))->E. Assuming that writes to regions 1 and 3 of volume D occur before the background copy for those regions takes place and that the background copy runs in full, the cascade becomes D->((1,0,1,0),(0,1,0,1))->F->((0,0,0,0),(0,1,1,0))->E. Since the copy from volume D to volume F is a clone, the background copy would not try to copy regions 1 and 3 again. It copies regions from volume D to volume F if volume F does not already contain its own copy of the data. If the background copy for a region occurs and then a write to the region on the upstream volume occurs, the write copy indicator on the downstream volume may be updated. Otherwise, the system may determine that the data still exists on the primary volume if only the background indicator is set.

If volume F is then to be removed from the cascade, volume F may need to be cleaned. By examining the bitmaps, it may be determined that region 3 needs to be cleaned because volume F contains data and it cannot be on volume D. That is, the volume map for volume F indicates that volume F obtained the data for region 3 due to a write, which means that the data no longer resides on volume D. Furthermore, the volume map for volume E indicates that the data does not exist on volume E. For region 1, however, although volume F's volume map indicates that volume F obtained the data in region 1 due to a write, volume E's volume map indicates that volume E already has data stored for this region, which means that volume E does not need the data in region 1 from volume F.

For region 0 and region 2, volume F's volume map indicates that volume F obtained the data due to a background copy, which means that the data should still exist on volume D. Thus, no copy of these regions needs to be made to volume F. Moreover, for region 2, volume E's volume map indicates that volume E obtained data from volume D earlier, which means that volume E already has the data it needs from volume D. Thus, no copy of region 2 needs to be made to volume F.

Volume F may then be cleaned by copying the data from region 3 of volume F to region 3 of volume E. The cleaning write to volume E may be treated as a write because volume D does not contain the data that volume E needs. Volume E's volume map may be adjusted to show the relationship between volume D and volume E-D->((0,0,0,0),(0,1,1,1))->E, which indicates that regions 1-3 of volume E obtained their data due to a write and region 0 of volume 3 has no data.

In this example, the amount of cleaning has been reduced by half. That is, without the volume maps, the cleaning would have also had to write region 0 of volume F to volume E because it would have been unclear as to why this data arrived on volume F. Larger savings are possible for larger numbers of regions as typically only a small number of regions of a volume would be written to while most of the data would be transferred due to a background copy, if applicable.

In some implementations, the amount of storage space for a volume map may be substantially reduced. For example, bitmaps are primarily needed if the expected IO pattern is random. This is typically true for external system IO but not for background IO. For background IO, the IO pattern is often sequenced, generally from the beginning of the volume to the end or vice-versa. Therefore, the background bitmap can be replaced with an index (e.g., a high watermark for copies beginning from the beginning of the volume and a low watermark for copies beginning from the end of the volume). Using an index, all regions on one side are considered copied, and on the other, they are considered not copied unless a write has occurred.

Returning to the first example above, if A->B and B->C are started at the same time, A->(HMW=0,(0,0,0))->B->(HWM=0,(0,0,0))->C. As the background copy runs, the mapping would update like this A->(hwm=1,(0,0,0))->B->(hwm=0,(0,0,0))->C and eventually become A->(hwm=3,(0,0,0))->B->(hwm=0,(0,0,0))->C, assuming no write to the volumes occurred. At this point, the data on volume A has been copied to volume B by background copy, and no cleaning would be required in this state to remove volume B from the cascade. Typically, the index quickly reaches the maximum if there is nothing to do because it is an electronic operation (e.g., there is no IO).

If there is a write to region 0 of volume A, the volume maps would become A->(hwm=2,(1,0,0))->B->(hwm=0,(0,0,0))->C even though no data needs to be transferred to volume B. Then, to remove volume B, it may be determined that just region 0 needs to be cleaned, which would result in A->(hwm=0,(1,0,0))->C. Thus, by using an index, the amount of storage space for mapping may be reduced by approximately half while still maintaining an accurate accounting of the data that needs to be transferred when a volume is removed from the cascade. In this case, for example, only one region was transferred to volume C when volume B was removed, instead of having to transfer all the regions if no mapping of volume B existed.

Figure 2B:
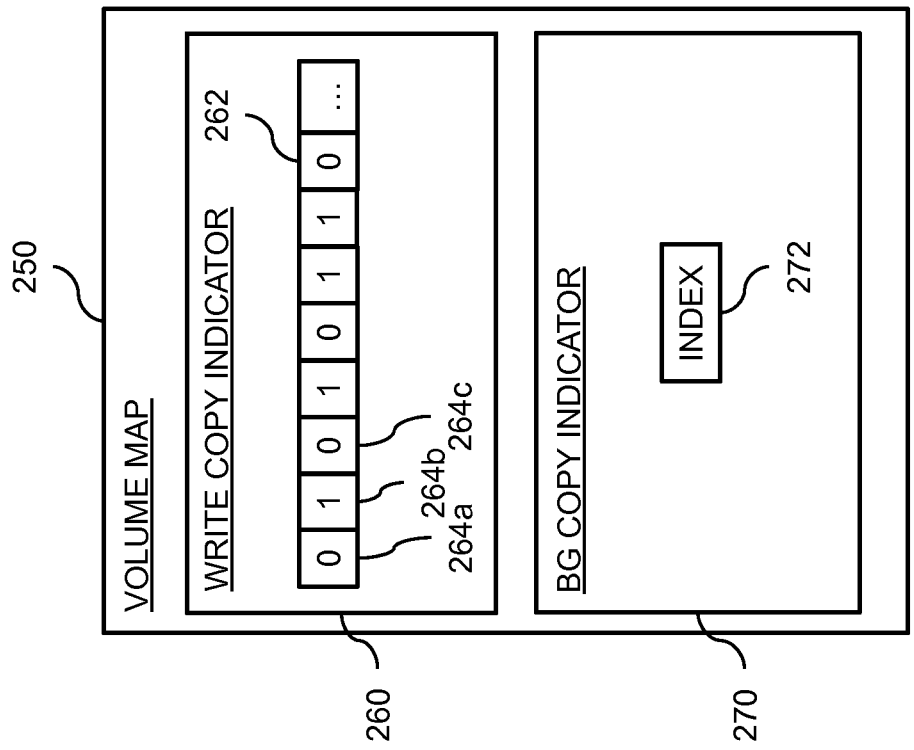
FIGS. 2A-B are block diagrams illustrating example volume maps for source cleaning cascaded volumes.
Figure 2A:
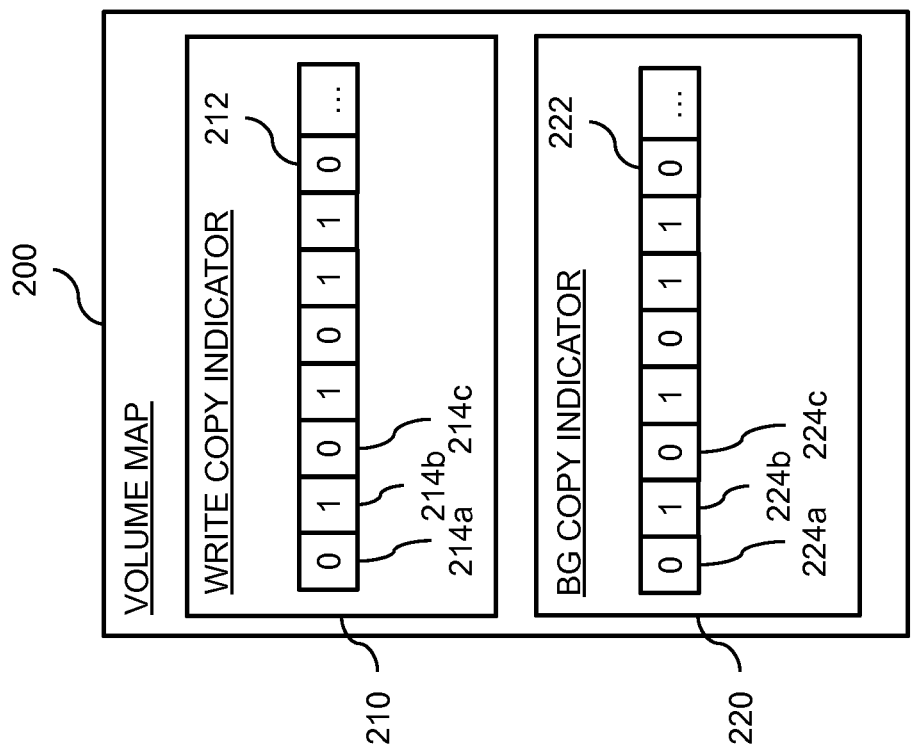

FIGS. 2A-B illustrate example volume maps 200, 250, respectively, for cascaded volumes. Volume map 200 includes a write copy indicator 210 and a background copy indicator 220. Write copy indicator 210 includes a bitmap 212 in which each bit 214 respectively corresponds to a region on the target volume (e.g., the volume to which a copy is being sent). In this example, if a region has received a write, it is indicated with a one, and if a region has not received a write, it is indicated with a zero. This marking may be reversed in other implementations. Similarly, background copy indicator 210 includes a bitmap 222 in which each bit 224 respectively corresponds to a region on the target volume. In this example, if a region has received a write due the execution of a background copy technique, it is indicated with a one, and if a region has not received a write, it is indicated with a zero. This marking may be reversed in other implementations.

Volume map 250 includes write copy indicator 260 and a background copy indicator 270. Write copy indicator 260 includes a bitmap 262 in which each bit 264 respectively corresponds to a region on the target volume (e.g., the volume to which a copy is being sent). By setting the bits to various values, write copy indicator 260 may indicate whether data in various regions of a volume is due to a write (e.g., directly to the volume or to an upstream volume). Background copy indicator 270 includes an index 272. Index 272 is a sequential indicator, in which the indicators map to regions on a volume. For example, index 272 may store a number (e.g., an integer) or one or more letters that map to regions on a volume. By examining index 272, a storage controller may determine how far a background copy has progressed in copying one volume to another.

Although FIGS. 2A-B illustrate two examples of volume maps, other examples of volume maps exist. For example, instead of using a bitmap, an indicator may use an array of flags (e.g., True/False) to indicate whether a condition has occurred. In general, any type of array or construct in which the positions may be mapped to regions of a volume may be used. Additionally, the arrays may be implemented as a single array (e.g., 2×N or N×2) or separate arrays and may be in the same portions of different portions of memory. Moreover, any logically discernible indicators may be used.

For this discussion, the metadata in volume maps 123 may generally be modified in the following manner to ensure that the data is tracked correctly. For external writes to a volume, mark the region in the write bitmap for the volume and in the write bitmap for the downstream volume (if it exists). A downstream volume may, for example, not exist if the volume is the earliest backup volume. For background writes to a volume, adjust the indicator if a background copy of a region was successful. For a background bitmap, this may involve setting the bit associated with the region. For an index, this may involve incrementing the index. If a copy on write has already been executed for a region, there may be no need to perform a write for a background copy or to adjust a background bitmap. Thus, these operations may be skipped (e.g., by examining write copy indicator). An indication that no more work needs to be performed may be sufficient.

Reads should begin at the volume that is time synchronized for the read. If data exists on the volume at the region in question, read that volume. If data does not exist on the volume at the region in question, proceed to the next volume upstream: 1) read that volume if it has no volume map (e.g., the chain has been traversed back to the primary volume); 2) read that volume if its volume map indicates that a write occurred for the region of interest; and 3) read the volume if its volume map indicates that a background copy process processed the region of interest. If the volume's map does not satisfy any of these conditions, proceed to the next upstream volume and analyze its volume map in the same manner.

For cleaning when a volume is being removed a cascade, the volume map of the volume being removed is analyzed first. If the map indicates that a region in the volume was written to because of a write, that region is a candidate for being moved to the next volume down the cascade. The volume map of the downstream volume is then checked for the region in question to determine whether the downstream volume already has data for that region. If the downstream volume does not have data for that region, the region in question is copied from the volume being removed to the downstream volume. Additionally, the volume map for the downstream volume is marked.

System 100 has a variety of features. For example, system 100 reduces the amount of cleaning required when a volume is removed from a cascade, which can substantially reduce the amount of time and effort it takes to remove the volume. Moreover, it may decrease the amount of data placed on a remaining volume. Additionally, this reduction can be achieved with small increase in metadata needed for classifying the data held on a region. Thus, the enhanced cleaning results may be achieved, with small metadata costs.

Although FIG. 1 illustrates one implementation of a system for source cleaning cascaded volumes, other systems may include fewer, additional, and/or a different arrangement of components. For example, multiple external systems may be writing to a storage system. Additionally, a storage system may have multiple sets of cascaded volumes. Moreover, multiple target cascades would work in exactly the same way as can be seen by some with ordinary skill in the area.

Figure 3:
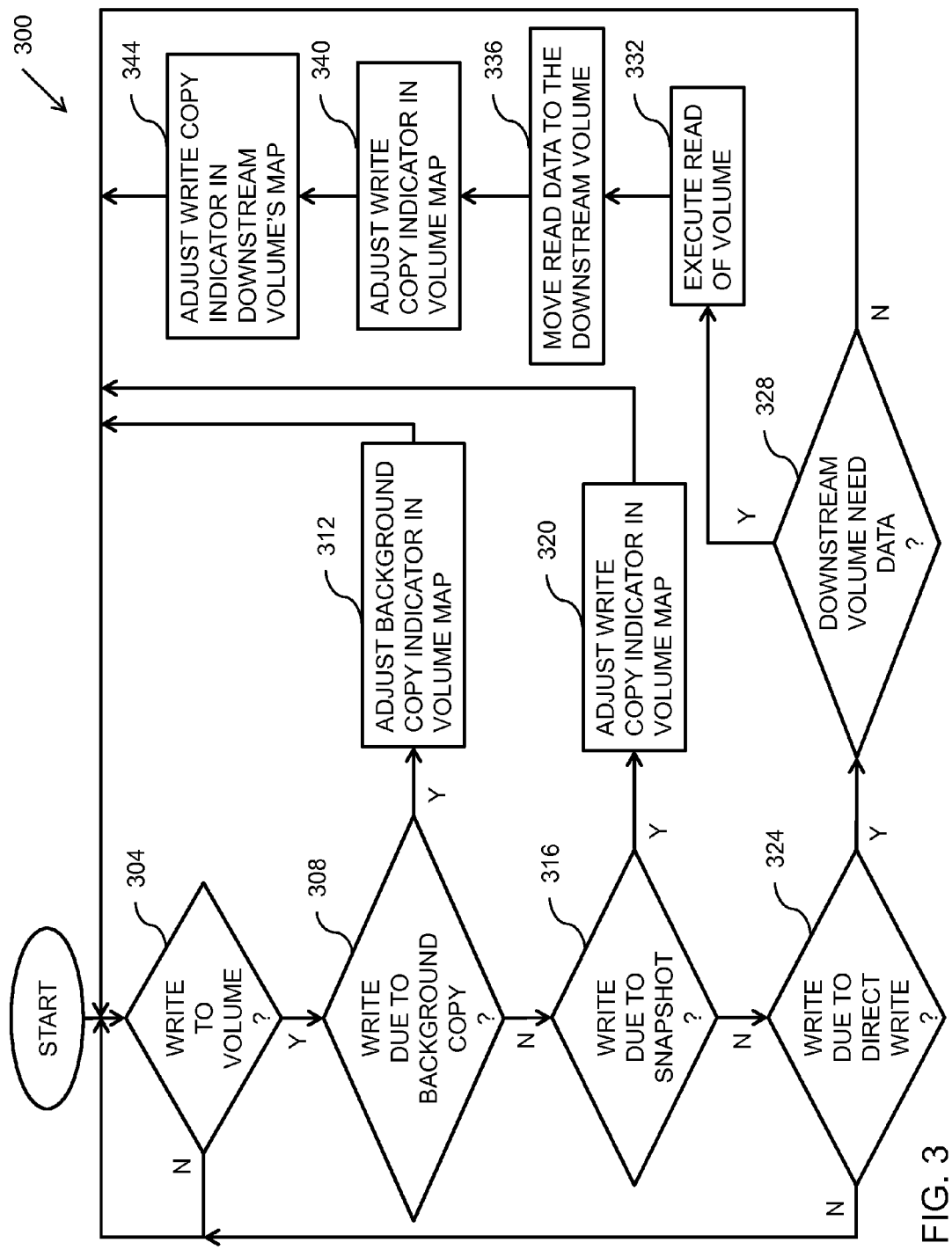
FIG. 3 is a flowchart illustrating an example process for source cleaning cascaded volumes.

FIG. 3 illustrates an example process 300 for source cleaning cascaded volumes. Process 300 may, for example, be performed by a system similar to system 100.

Process 300 calls for determining whether a write for a volume has been received (operation 304). If a write for a volume has not been received, process 300 calls for waiting for a write for a volume.

Once a write for a volume has been received, process 300 calls for determining whether the write is due to a background copy being created on the volume (operation 308). A storage controller may, for example, keep track of the types of copies (e.g., clone versus snapshot) between the volumes in the same manner as other configuration data (e.g., in metadata). If the write is due to a background copy being created on the volume, process 300 calls for adjusting a background copy indicator in the volume's volume map (i.e., the map between the volume being cloned and the volume receiving the write). The volume map may, for example, be adjusted by adjusting (e.g., incrementing or decrementing) an index. Process 300 then returns to wait for another write for the volume.

If the write is not due to a background copy being created on the volume, process 300 calls for determining whether the write is due a snapshot copy being created on the volume (operation 316). If the write is due to a snapshot copy being created on the volume, process 300 calls for adjusting a write copy indicator in the volume's volume map (operation 320). The volume map may, for example, be adjusted by setting a bit associated with the region. If a write to the upstream volume occurs after a background copy has been performed, the write copy indicator may also be adjusted. Process 300 then returns to wait for another write for the volume.

If the write is not due to a snapshot copy being created on the volume (e.g., because a write is coming in directly to the volume from an external source), process 300 calls for determining whether the write is due to a direct write to the volume (operation 324). If the write is not due to a direct write to the volume, process 300 calls for waiting for another write for the volume (operation 304).

If, however, the write is due to a direct write to the volume, process 300 calls for determining whether a downstream volume needs data (operation 328). A downstream volume may, for example, need data if the write is to a region that is storing data for the downstream volume or the write is to a region that corresponds to one on an upstream volume that is storing data for the downstream volume (e.g., if a region is being written to on a volume in the middle of a cascade when the primary volume is still storing data for a volume further down the cascade). If a downstream volume does not need data, process 300 calls for waiting for another write for the volume (operation 304).

If, however, a downstream volume does need data, process 300 calls for executing a read of the volume for the region associated with the write (operation 332). The read may, for instance, be accomplished according to the IO rules described above. Thus, the read may be of the volume being written to or an upstream volume.

Process 300 also calls for moving the read data to the downstream volume (operation 336). The downstream volume would receive the data as a split write, or copy. Process 300 further calls for adjusting a write copy indicator for the volume map of the volume (operation 340) and adjusting the write copy indicator for the volume map of the downstream volume (operation 344). Process 300 then returns to wait for another write for the volume.

Process 300 may operate as long as backup volumes are being copied. Thus, process 300 can be repeated a large number of times during normal operations.

Figure 4:
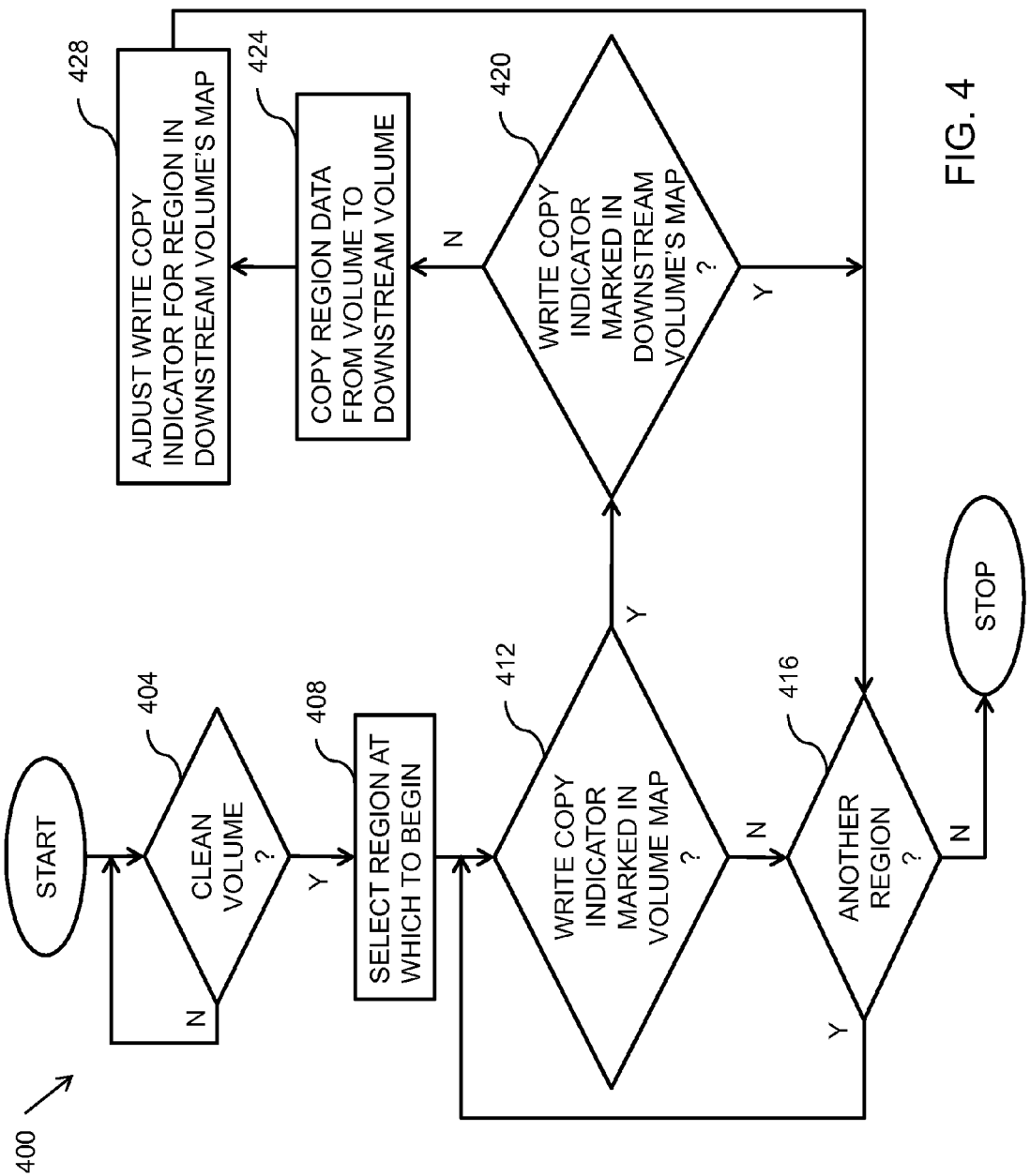
FIG. 4 is a flowchart illustrating another example process for source cleaning cascaded volumes.

FIG. 4 illustrates another example process 400 for source cleaning cascaded volumes. Process 400 may, for example, be performed by a system similar to system 100. Moreover, process 400 may be used in conjunction with process 300.

Process 400 calls for determining whether a volume is to cleaned (operation 404). A volume may, for example, need to be cleaned if it is to be removed from a cascade or to be restarted. If a volume is not to be cleaned, process 400 calls for waiting for a volume to be cleaned.

Once a volume is to be cleaned, process 400 calls for selecting a region of the volume at which to begin the cleaning (operation 408). This may, for example, occur by selecting the first region on the volume, the last region on the volume, or a region in between. Process 400 also calls for determining whether the region is marked in a write copy indicator in the volume's volume map (operation 412). The region may, for example, be marked if an indicator (e.g., bit or flag) has been set for the region. If the region is not marked in the write copy indicator of the volume's volume map, process 400 calls for determining whether there is another region of the volume to analyze (operation 416). If there is another region to analyze, process calls for determining whether the region is marked in write copy indicator of the volume's volume map (operation 412). Process 400 may continue to cycle through operation 412-416 until all of the regions of the volume have been analyzed, at which point process 400 is at an end, or until a region is marked in the write copy indicator of the volume's volume map.

If a region is marked in the write copy indicator of the volume's volume map, process 400 calls for determining whether the region is marked in a write copy indicator in a downstream volume's volume map (operation 420). If the region is marked in a write copying indicator in a downstream volume's volume map, process 400 calls for determining whether there is another region of the volume to analyze (operation 416). If the region is not marked in a downstream volume's volume map, process 400 calls for copying the data in the region to a downstream volume (operation 424). Process 400 also calls for adjusting the write copy indicator in the downstream volume's volume map for the region (operation 428). Process 400 then calls for determining whether there is another region of the volume to analyze (operation 416).

Process 400 may operate as long as backup volumes are being copied. Thus, process 400 can be repeated a large number of times during normal operations.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

Figure 5:
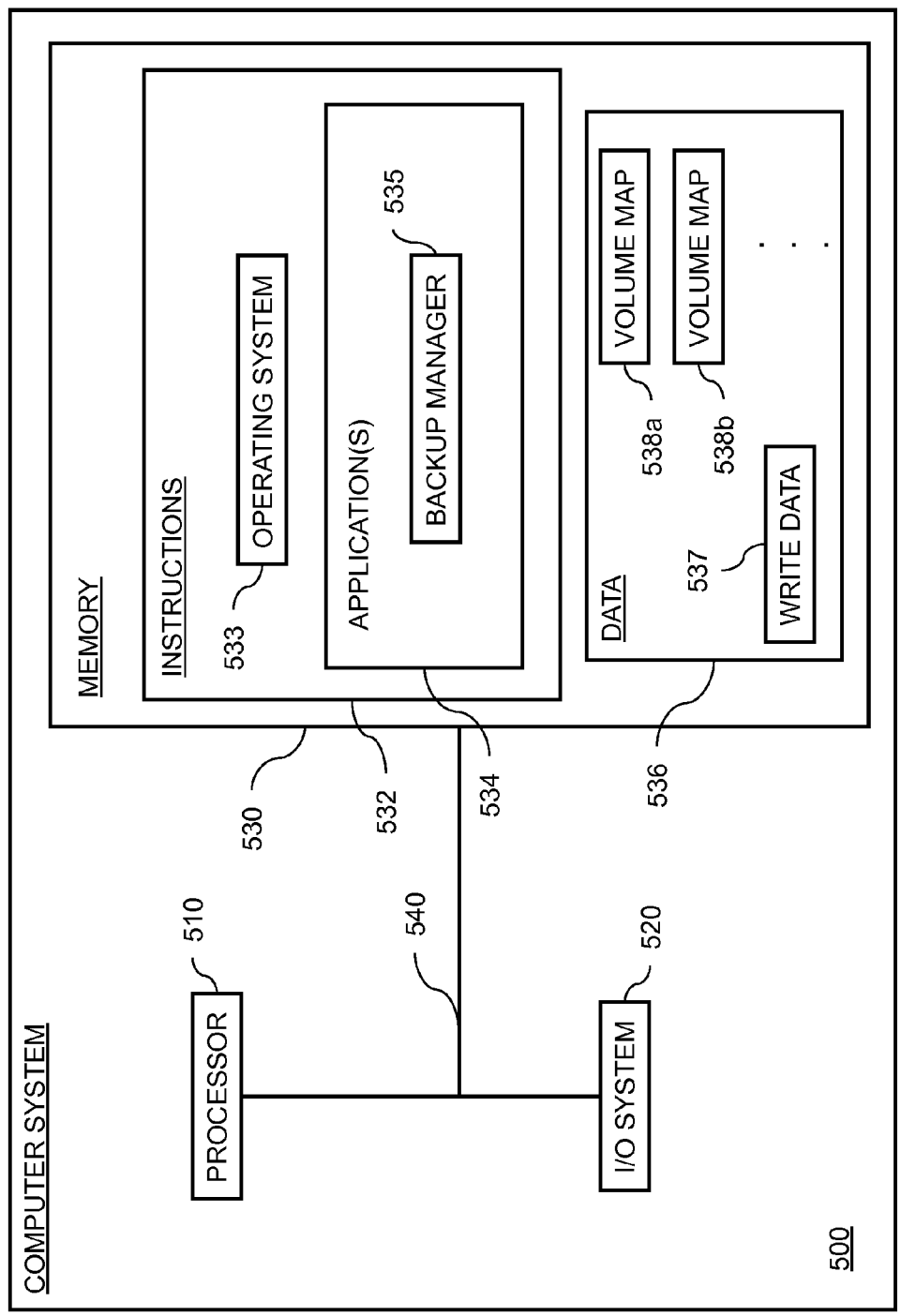
FIG. 5 is a block diagram illustrating an example computer system for source cleaning cascaded volumes.

FIG. 5 illustrates an example computer system 500 for managing source cleaning for cascaded copies. Computer system 500 may, for example, illustrate some of the components of a storage controller of a storage system.

System 500 includes a processor 510, an input/output system 520, and memory 530, which are coupled together by a network 540. As illustrated, computer system 500 is functioning as a storage controller of a storage system.

Processor 510 typically includes a logical processing unit (e.g., an arithmetic logic unit) that processes data under the direction of program instructions (e.g., from software). For example, processor 510 may be a microprocessor, a microcontroller, or an application specific integrated circuit. The processor may operate by reduced instruction set computer (RISC) or complex instruction set computer (CISC) principles. In general, the processor may be any device that manipulates data in a logical manner.

Input/output system 520 may include one or more communication interfaces and/or one or more other user interfaces. A communication interface may, for instance, be a network interface card (whether wireless or wireless) or a modem. A user interface could, for instance, be a user input device (e.g., a keyboard, a keypad, a touchpad, a stylus, or a microphone) or a user output device (e.g., a monitor, a display, or a speaker). In general, input-output system 520 may be any combination of devices by which a computer system can receive and output data.

Memory 530 may, for example, include random access memory (RAM), read-only memory (ROM), flash memory, and/or disc memory. Various items may be stored in different portions of the memory at various times. Memory 530, in general, may be any combination of devices for storing data.

Memory 530 includes instructions 532 and data 536. Instructions 532 include an operating system 533 (e.g., Windows, Linux, or Unix) and applications 534, which include a backup manager 535. Data 536 includes the data required for and/or produced by applications 534, including write data 537 and volume maps 538.

Network 540 is responsible for communicating data between processor 510, input/output system 520, and memory 530. Network 540 may, for example, include a number of different types of busses (e.g., serial and parallel).

In certain modes of operation, processor 510 is able to receive writes (e.g., from an external system) and prepare them for storage managed by the computer system. Additionally, processor 510, according to backup manager 535, may generate backup volumes for a volume in the storage. Each backup volume may have an associated volume map 538, which may indicate why data was placed in a volume on a per region basis. Processor 510 may update volume maps 538 as data is written to the volumes. Additionally, process 510 may use the volume maps when a volume is to be removed from a cascade of volumes. Processor 510 may, for example, accomplish this by implementing any of the techniques discussed above, including one or more parts of processes 300-400.

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for source cleaning cascaded volumes, and several others have been mentioned or suggested. Moreover, those skilled in the art will readily recognize that a variety of additions, deletions, modifications, and substitutions may be made to these implementations while still achieving source cleaning cascaded volumes. Thus, the scope of the protected subject matter should be judged based on the following claims, which may capture one or more concepts of one or more implementations.

The invention claimed is:

1. A method comprising:
   storing a primary volume and a plurality of cascaded backup volumes for the primary volume;
   determining whether a write to one of the backup volumes is due to a background copy being made of another volume in the cascade;
   adjusting a background copy indicator in a volume map for the backup volume if the write is due to a background copy of another volume in the cascade;
   determining whether a write to one of the backup volumes is due to a write to another volume in the cascade; and
   adjusting a write copy indicator in a volume map for the backup volume if the write is due to a write to another volume in the cascade; and
   wherein the volume map for each respective backup volume comprises at least two bitmaps, each bitmap including bits that respectively correspond to regions of the volume, one of the bitmaps indicating whether regions contain data due to writes to another volume and one of the bitmaps indicating whether regions contain data due to a background copy of another volume.

2. The method of claim 1, further comprising:
- determining whether a write to one of the backup volumes is a direct write to the volume;
- determining, if a write is a direct write, whether data needs to be moved to a downstream volume in the cascade;
- executing a read of the backup volume if data needs to be moved to a downstream volume in the cascade;
- moving the read data to the downstream volume;
- adjusting a write copy indicator in the volume map for the downstream volume; and
- adjusting a write copy indicator in the volume map for the backup volume.

3. The method of claim 1, wherein a volume map comprises a bitmap and an index, the bitmap including bits that respectively correspond to regions of the volume and indicating whether regions contain data due to writes, and the index indicating how much of a volume contains data due to a background copy of another volume.

4. The method of claim 1, further comprising:
- determining whether one of the backup volumes in the cascade should be cleaned;
- determining, if a backup volume should be cleaned, whether a write copy indicator for a region of the volume to be cleaned is marked in the volume's volume map; and
- selecting another region to analyze if the write copy indicator for the region is not marked in the volume's volume map.

5. The method of claim 4, further comprising:
- determining, if the write copy indicator for the region is marked in the volume to be cleaned's volume map, whether a write copy indicator for the region is marked in a volume map for a downstream volume in the cascade;
- selecting another region to analyze if the write copy indicator for the region is marked in the downstream volume's volume map; and
- copying, if the write copy indicator for the region is not marked in the downstream volume's volume map, the region's data from the volume being cleaned to the downstream volume.

6. The method according to claim 5, further comprising adjusting a write copy indicator for the region in the volume map for the downstream volume.

7. The method according to claim 4, further comprising determining that a volume should be cleaned based on the volume being removed from the cascade.

8. A method comprising:
- storing a primary volume and a plurality of cascaded backup volumes for the primary volume;
- determining whether a write to one of the backup volumes is due to a background copy being made of another volume in the cascade;
- adjusting a background copy indicator in a volume map for the backup volume if the write is due to a background copy of another volume in the cascade;
- determining whether a write to one of the backup volumes is due to a write to another volume in the cascade;
- adjusting a write copy indicator in a volume map for the backup volume if the write is due to a write to another volume in the cascade;
- determining whether one of the backup volumes in the cascade should be cleaned;
- determining, if a backup volume should be cleaned, whether a write copy indicator for a region of the volume to be cleaned is marked in the volume's volume map;
- selecting another region to analyze if the write copy indicator for the region is not marked in the volume's volume map;
- determining, if the write copy indicator for the region is marked in the volume to be cleaned's volume map, whether a write copy indicator for the region is marked in a volume map for a downstream volume in the cascade;
- selecting another region to analyze if the write copy indicator for the region is marked in the downstream volume's volume map; and
- copying, if the write copy indicator for the region is not marked in the downstream volume's volume map, the region's data from the volume being cleaned to the downstream volume.

9. The method according to claim 8, further comprising adjusting a write copy indicator for the region in the volume map for the downstream volume.

10. The method according to claim 9, further comprising determining that a volume should be cleaned based on the volume being removed from the cascade.

* * * * *